(12) United States Patent
Gautam et al.

(10) Patent No.: US 8,760,995 B1
(45) Date of Patent: Jun. 24, 2014

(54) SYSTEM, METHOD, AND COMPUTER PROGRAM FOR ROUTING DATA IN A WIRELESS SENSOR NETWORK

(75) Inventors: Amit Gautam, Jagadhari (IN); Ajay Kumar Gautam, Ambala (IN); Ram Bahadur Patel, Varanasi (IN)

(73) Assignee: Amdocs Software Systems Limited, Dublin (IE)

( * ) Notice: Subject to any disclaimer, the term of this patent is extended or adjusted under 35 U.S.C. 154(b) by 277 days.

(21) Appl. No.: 12/832,945

(22) Filed: Jul. 8, 2010

(51) Int. Cl.
*G06F 11/00* (2006.01)
*H04L 12/26* (2006.01)
*H04B 7/15* (2006.01)

(52) U.S. Cl.
USPC ........... 370/216; 370/328; 370/351; 455/11.1

(58) Field of Classification Search
USPC ......... 370/236, 238, 252, 254, 255, 310, 315, 370/351, 392, 400
See application file for complete search history.

(56) References Cited

U.S. PATENT DOCUMENTS

| | | | |
|---|---|---|---|
| 7,020,501 B1 | 3/2006 | Elliott et al. | |
| 7,421,257 B1 | 9/2008 | Elliott | |
| 7,463,890 B2 | 12/2008 | Herz et al. | |
| 7,633,882 B2 | 12/2009 | Das et al. | |
| 7,813,326 B1 * | 10/2010 | Kelm et al. | 370/338 |
| 7,952,522 B2 * | 5/2011 | Hohl | 342/463 |
| 8,045,463 B2 * | 10/2011 | Radunovic et al. | 370/231 |
| 8,392,401 B1 * | 3/2013 | Aly et al. | 707/718 |
| 2005/0073958 A1 * | 4/2005 | Atlas et al. | 370/238 |
| 2006/0126826 A1 * | 6/2006 | Rega et al. | 380/28 |
| 2008/0101260 A1 * | 5/2008 | Maruyama | 370/255 |
| 2009/0003214 A1 * | 1/2009 | Vaswani et al. | 370/236 |
| 2009/0141666 A1 * | 6/2009 | Jin et al. | 370/315 |
| 2009/0201899 A1 | 8/2009 | Liu et al. | |
| 2009/0285154 A1 * | 11/2009 | Gesmundo et al. | 370/316 |
| 2010/0150122 A1 * | 6/2010 | Berger et al. | 370/338 |

OTHER PUBLICATIONS

"Internet of Things in 2020: Roadmap for the Future," retrieved online from http://www.smart-systems-integration.org/public/internet-of-things, 2008, p. 1-31.
Chatzigiannakis et al., "Smart dust protocols for local detection and propagation," Distinguished paper, In Proceedings of the 2nd ACM Workshop on Principles of Mobile Computmg—POMC'2002, Oct. 30-31, 2002, Toulouse, France p. 9-16.

(Continued)

*Primary Examiner* — Hoon J Chung
*Assistant Examiner* — Yaotang Wang
(74) *Attorney, Agent, or Firm* — Zilka-Kotab, PC (57) ABSTRACT

A system, method, and computer program product are provided for routing data in a wireless sensor network. In use, sensed data is identified utilizing a first sensor node of a plurality of sensor nodes in a wireless sensor network, the sensor nodes each capable of sensing data. Additionally, a plurality of parameters associated with each route existing between the first sensor node and a gateway node in the wireless sensor network connecting the wireless sensor network to another network is received at the first sensor node from at least one second sensor node in direct communication with the first sensor node via the wireless communication network. Furthermore, one of the at least one second sensor node that is in direct communication with the first sensor node is selected, based on the parameters. Still yet, the sensed data is forwarded from the first sensor node to the selected second sensor node.

17 Claims, 6 Drawing Sheets

(56) References Cited

OTHER PUBLICATIONS

Heinzelman et al., "An application-specific protocol architecture for wireless micro-sensor networks," in the Proceeding of the Hawaii International Conference System Sciences, Hawaii, Jan. 2000, IEEE Transactions on Wireless Communications, vol. 1, No. 4, Oct. 2002, p. 660-670.

Lindsey et al., "PEGASIS: Power-Efficient Gathering in Sensor Information Systems," IEEE Aerospace Conference Proceedings, vol. 3, 9-16, Updated Sep. 29, 2001, p. 1125-1130.

Wang et al., "HMRP: Hierarchy-Based Multipath Routing Protocol for Wireless Sensor Networks," Tamkang Journal of Science and Engineering, vol. 9, No. 3, 2006, p. 255-264.

Liu et al., "An Energy-Efficient protocl for Wireless Sensor Networks," WCICA 2008. $7^{th}$ World Congress on Intelligent Control and Automation, Aug. 8, 2008, abstract only, p. 1-2.

* cited by examiner

SYSTEM, METHOD, AND COMPUTER PROGRAM FOR ROUTING DATA IN A WIRELESS SENSOR NETWORK

FIELD OF THE INVENTION

The present invention relates to wireless sensor networks, and more particularly to routing data in wireless sensor networks.

BACKGROUND

Wireless sensor networks generally include networks of sensors that are capable of sensing data, such as the identification of a physical object or inanimate conditions. Thus, wireless sensor networks may be utilized for identifying and routing such data, for example, to traditional networks. Unfortunately, conventional techniques utilized for transmitting data sensed in a wireless sensor network to a traditional network have exhibited various limitations. For example, such techniques have generally been deficient with respect to routing sensed data in an energy efficient, time constrained, and reliable manner.

There is thus a need for addressing these and/or other issues associated with the prior art.

SUMMARY

A system, method, and computer program product are provided for routing data in a wireless sensor network. In use, sensed data is identified utilizing a first sensor node of a plurality of sensor nodes in a wireless sensor network, the sensor nodes each capable of sensing data. Additionally, a plurality of parameters associated with each route existing between the first sensor node and a gateway node in the wireless sensor network connecting the wireless sensor network to another network is received at the first sensor node from at least one second sensor node in direct communication with the first sensor node via the wireless communication network. Furthermore, one of the at least one second sensor node that is in direct communication with the first sensor node is selected, based on the parameters. Still yet, the sensed data is forwarded from the first sensor node to the selected second sensor node.

DETAILED DESCRIPTION

Figure 1:
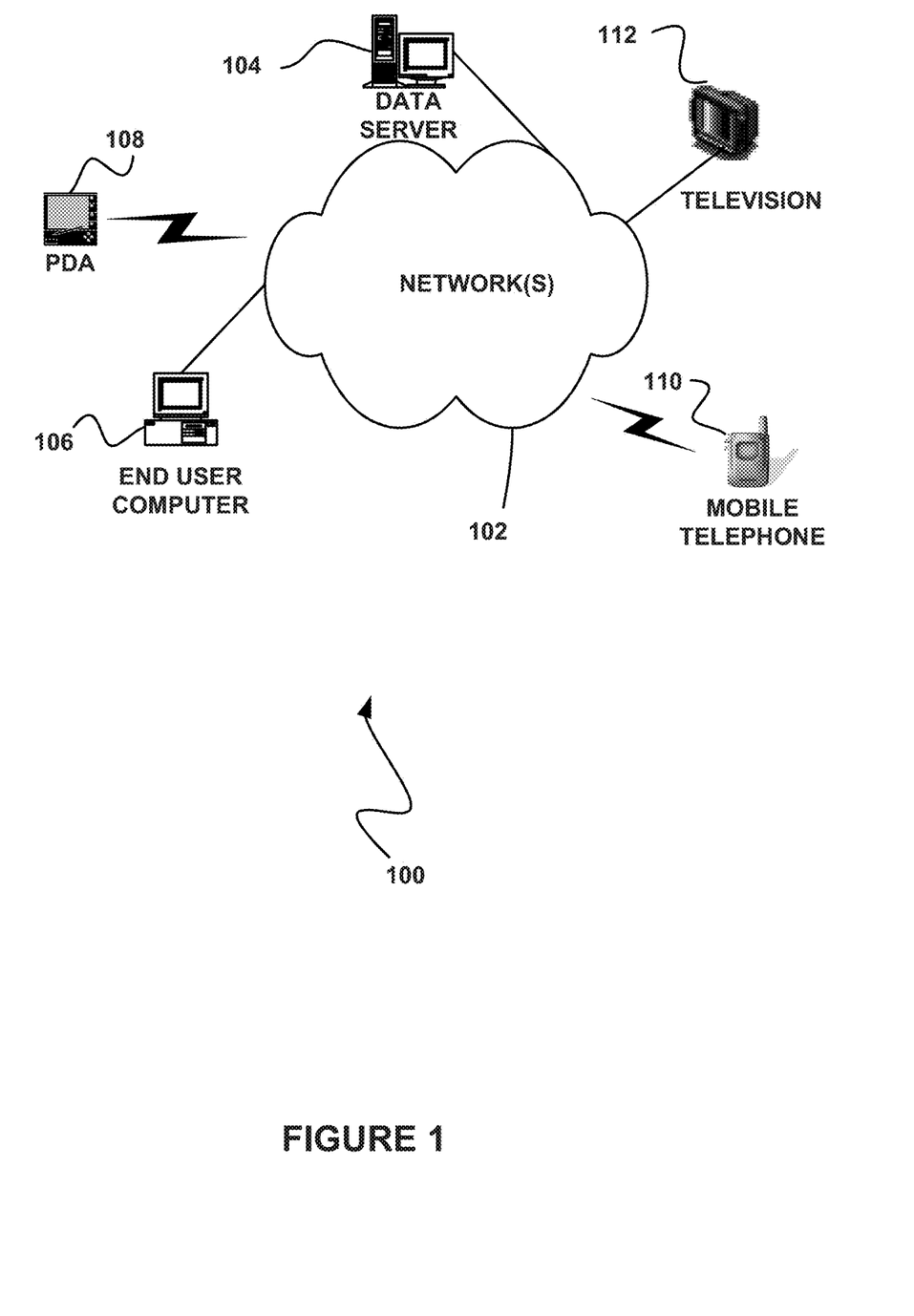
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
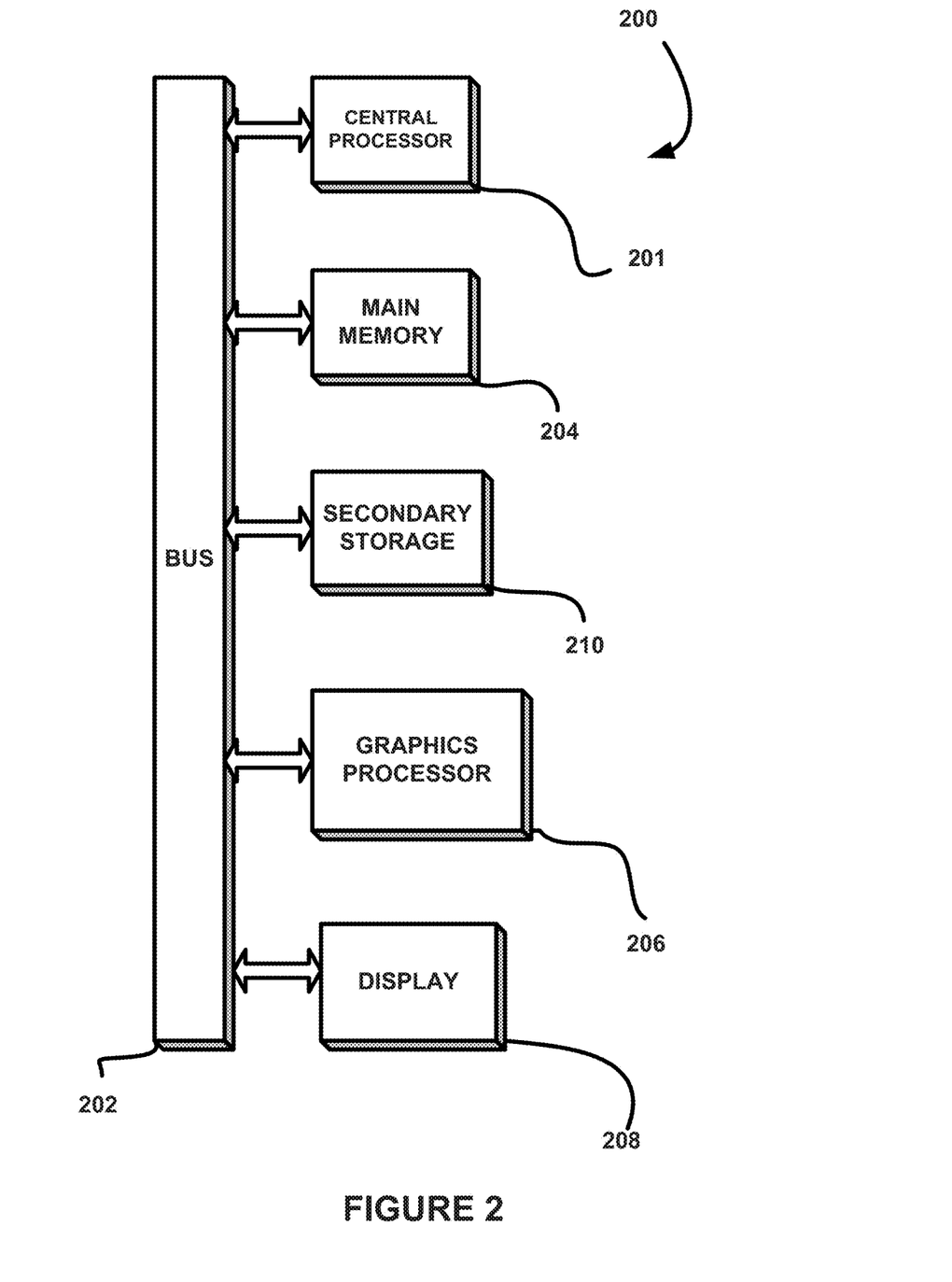
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
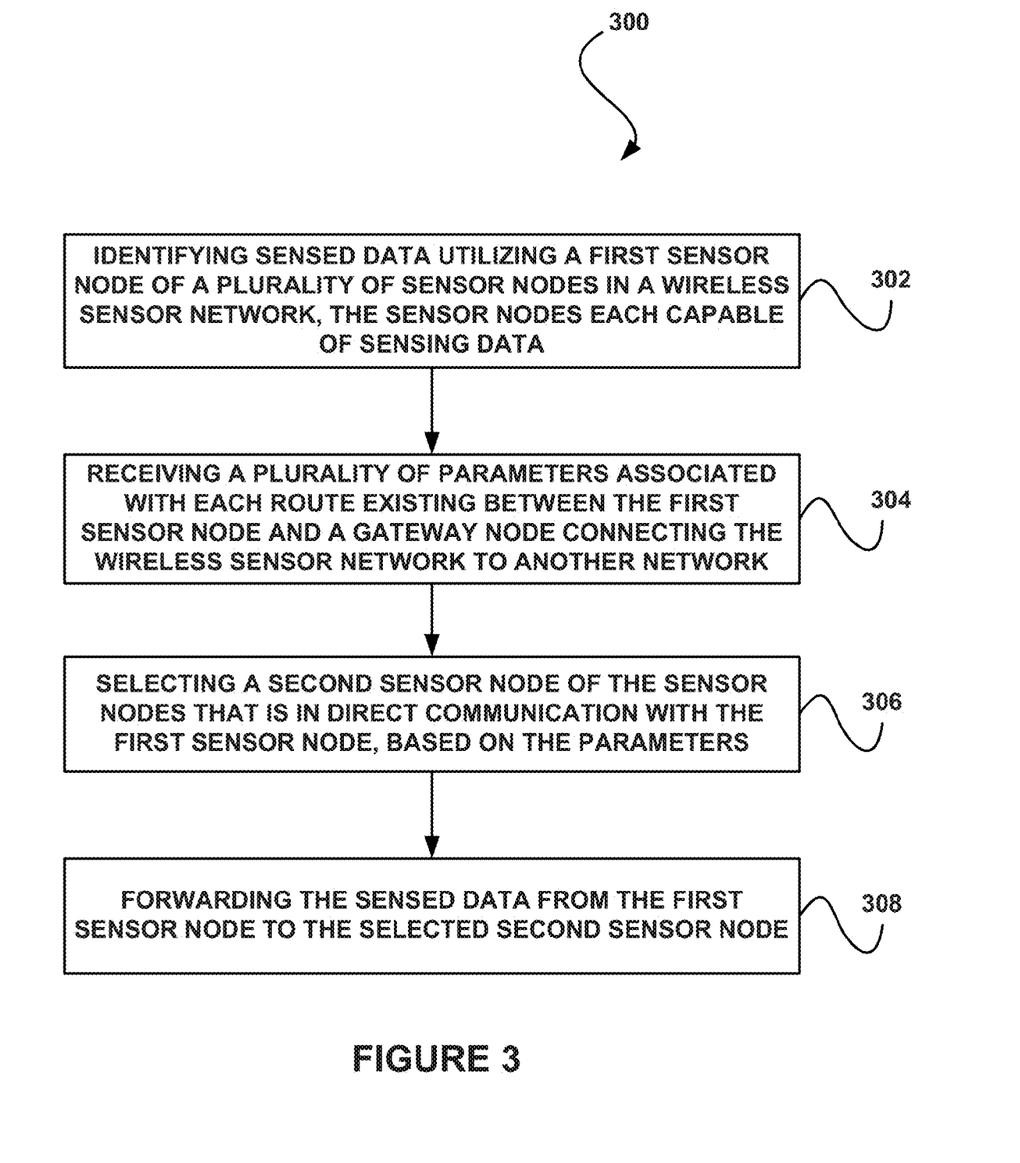
FIG. 3 illustrates a method for routing data in a wireless sensor network, in accordance with another embodiment.

FIG. 3 illustrates a method 300 for routing data in a wireless sensor network, in accordance with another embodiment. As an option, the method 300 may be carried out in the context of the details of FIGS. 1 and/or 2. Of course, however, the method 300 may be carried out in any desired environment. Further, the aforementioned definitions may equally apply to the description below.

As shown in operation 302, sensed data is identified utilizing a first sensor node of a plurality of sensor nodes in a wireless sensor network, the sensor nodes each capable of sensing data. The wireless sensor network may include any (e.g. homogenous) wireless network of sensor nodes that are utilized for sensing data. Thus, the sensor nodes may each communicate with one another wirelessly, either directly or indirectly, via the wireless sensor network.

In addition, as noted above, the sensor nodes may include any nodes in wireless communication with one another that are each capable of sensing data. For example, the sensor nodes may be capable of identifying and/or localizing objects (e.g. devices, such as any of those described above with respect to FIGS. 1 and/or 2, etc.) existing outside of the wireless sensor network. Optionally, the sensor nodes may be stationary or mobile, and a location of such sensor nodes may be identifiable (e.g. by the sensor nodes themselves).

As another example, the sensor nodes may provide processing and/or communication capabilities to the objects. In various exemplary embodiments, the sensor nodes may provide inventory stock record, agriculture field monitoring, household devices tracking, volcano and forest fire reporting, healthcare information, battlefield surveillance, etc. To this end, the sensed data identified utilizing the first sensor node may include an object identifier, an environmental condition (e.g. temperature, natural disaster, etc.), data sensed from an object outside of the wireless sensor network, or any other data capable of being sensed by a sensor node of the wireless sensor network.

In one embodiment, the sensed data may be sensed by the first sensor node. Thus, the sensed data may be identified by the first sensor node sensing the data. In another embodiment, the sensed data may be sensed by another one of the sensor nodes and may be identified by the first sensor node in response to receipt thereof from such other one of the sensor nodes by the first sensor node (e.g. via the wireless sensor network).

Additionally, as shown in operation 304, a plurality of parameters associated with each route existing between the first sensor node and a gateway node in the wireless sensor network connecting the wireless sensor network to another network is received. It should be noted that such other network may include any network that is separate from, but connected to, the wireless sensor network. Just by way of example, the other network may include the Internet. In one embodiment, the wireless sensor network and the other network may be connected for communicating the sensed data from the wireless sensor network to the other network, as described in more detail below.

It should be noted that the gateway node connecting the wireless sensor network to the other network may itself be a sensor node. Of course, the gateway node may not necessarily be utilized for sensing data in the wireless sensor network, such that the gateway node may be utilized for communicating data (e.g. sensed data) between the wireless sensor network and the other network.

Moreover, the routes existing between the first sensor node and a gateway node may each include a path between the first sensor node and the gateway node across which communications may travel. For example, the routes may be capable of transmitting the sensed data. It should be noted that with respect to the present description the routes may each include at least one other intermediate sensor node between the first sensor node and the gateway node across which the communications must travel. Thus, the first sensor node and the gateway node may not necessarily be in direct communication with one another.

In one embodiment, the parameters may be received at the first sensor node from at least one second sensor node in direct communication with the first sensor node via the wireless communication network. Optionally, such second sensor node may include one of the aforementioned intermediate sensor nodes, such that the second sensor node may exist in a route between the first sensor node and the gateway node (e.g. and may be closer to the gateway node in terms of hop count as compared to the first sensor node). For example, for each second sensor node in direct communication with the first sensor node, the parameters may be received therefrom for the routes that are inclusive of the second sensor node.

In another embodiment, the parameters may be identified by the second sensor node. Such parameters may each optionally be generated by the second sensor node based on a predetermined algorithm, such as in the manner described in more detail below. Thus, the parameters associated with each route may include a set of predetermined types of parameters (e.g. based on the predetermined algorithms).

In yet another embodiment, the parameters associated with each route may be generated based on information gathered across sensor nodes included in the route. Just by way of example, the parameters may be generated for a route by determining, at a root parent sensor node in direct communication with the gateway node, a value for each of a plurality of predetermined types of parameters. Such value for each of the predetermined types of parameters may then be transmitted to an immediate child sensor node in the route. The immediate child sensor node may include a sensor node in direct communication with the root parent sensor node.

Further, the value for each of the predetermined types of parameters may be updated at the child sensor node. For example, such values may be updated based on information identified by the child sensor node, such as a status of the child sensor node. The aforementioned transmitting and updating may then be repeated for each subsequent sensor node in the route, such that the parameters received at the first sensor node may include the value for each of the predetermined types of parameters updated by the second sensor node.

In one exemplary embodiment, the parameters may be sent from a parent sensor node to its child sensor nodes in form of a self profile packet (SPP). Upon receipt of the SPP by a child sensor node, the child sensor node may update the contents of the SPP according to its own parameters (e.g. as described in the SPP protocol). The child sensor node (now considered a parent sensor node) may then transmit the updated SPP to its own children. This updating and transmitting may continue from parent sensor nodes to child sensor nodes in this manner until the SPP is received by the first sensor node described above.

By receiving the parameters from the second sensor node(s), as described above, use of a separate component (e.g. controller) to determine the parameters and/or communicate the parameters to the first sensor node may be avoided. To this end, hardware costs for routing data in a wireless sensor network according to the present method 300 may be reduced by eliminating use of such a separate component, reliability of the values of the parameters may be enhanced by receiving the parameters directly from the sensor nodes included in the routes by which the sensed data may be communicated, etc.

In one embodiment, the parameters associated with each route may include a hop count of the route (referred to below as hCount). Thus, in the example described above in which the parameters are generated based on information gathered across sensor nodes included in the route, the root parent sensor node (i.e. the sensor node in direct communication with the gateway node) may identify a hop count from itself to the gateway node, which in the present example would be the value "1", and may transmit such value to the child sensor node of such root parent sensor node in the route. The child sensor node may then update the value to reflect the hop count from itself to the gateway node (e.g. by adding to the value the hop count from the child sensor node to the root parent sensor node), and may transmit the updated value to a subsequent child sensor node of the child sensor node. Thus, each sensor node in the route may be utilized for generating the hop count of the route that is ultimately provided to the first sensor node.

In another embodiment, the parameters associated with each route may include an average hop distance of the route (referred to below as $H_{PATH}$). Such average hop distance may include the mean inter-nodal distance for all hops from the root parent sensor node to the second sensor node in direct communication with the first sensor node. Thus, the average hop distance may include an estimate of the average distance that is required to communicate the sensed data in a single hop (e.g. where a larger value for the average hop distance means more energy consumption will utilized for communicating the sensed data).

It should be noted that the average hop distance may be measured utilizing any desired metric (e.g. feet, miles, etc.). Further, the average hop distance may be generated based on information gathered across sensor nodes included in the route in a manner similar to that described above with respect to the hop count. Table 1 illustrates one example of a predetermined algorithm for calculating the average hop distance of the route. Of course, it should be noted that such predetermined algorithm is set forth for illustrative purposes only, and thus should not be construed as limiting in any manner.

TABLE 1

$$H_{PATH} = \left( \sum_{i=1}^{hCount-1} d_i \right) / (hCount - 1)$$

Where, $d_i$ is the distance between node with hCount 'i' and the one with hCount 'i+1'.

In yet another embodiment, the parameters associated with each route may include a standard deviation of the average hop distance of the route (referred to below as $\sigma_{PATH}$). Such standard deviation may include an amount by which the inter-nodal distances deviate from the $H_{PATH}$ for the route (e.g. and may thus provide a stability parameter for hop distances). Table 2 illustrates one example of a predetermined algorithm for calculating the standard deviation of the average hop distance of the route. Of course, it should be noted that such predetermined algorithm is set forth for illustrative purposes only, and thus should not be construed as limiting in any manner.

TABLE 2

$$\sigma_{PATH} = \sqrt{\left( \sum_{i=1}^{hCount-1} (H_{PATH} - d_i)^2 \right) / (hCount - 1)}$$

In still yet another embodiment, the parameters associated with each route include an average of remaining energy of sensor nodes in the route (referred to below as $H_{EREM}$). The average of the remaining energy may indicate whether the route has sufficient energy to complete a communication of the sensed data to the gateway node. Table 3 illustrates one example of a predetermined algorithm for calculating the average of remaining energy of sensor nodes in the route. Of course, it should be noted that such predetermined algorithm is set forth for illustrative purposes only, and thus should not be construed as limiting in any manner.

TABLE 3

$$H_{EREM} = \left( \sum_{i=1}^{hCount-1} Erem_i \right) / (hCount - 1)$$

Where, $Erem_i$ is the remaining energy of node at $i^{th}$ hop

In a further embodiment, the parameters associated with each route may include a standard deviation of the average of remaining energy of sensor nodes in the route. Such standard deviation may indicate the variations in the energy levels on sensor nodes in the route. Table 4 illustrates one example of a predetermined algorithm for calculating the standard deviation of the average of remaining energy of sensor nodes in the route. Of course, it should be noted that such predetermined algorithm is set forth for illustrative purposes only, and thus should not be construed as limiting in any manner.

TABLE 4

$$\sigma_{EREM} = \sqrt{\left( \sum_{i=1}^{hCount-1} (H_{EREM} - Erem_i)^2 \right) / (hCount - 1)}$$

In still yet another embodiment, the parameters associated with each route may include a reliability of the route. The reliability may include a probability that transmission of the sensed data to the gateway node will be completed. In one embodiment, the reliability of the route may be in terms of the aforementioned parameters (e.g. inter-nodal distances, remaining energies, etc.).

Table 5 illustrates one example of a predetermined algorithm for calculating the reliability of the route. Of course, it should be noted that such predetermined algorithm is set forth for illustrative purposes only, and thus should not be construed as limiting in any manner.

TABLE 5

A given path can be considered as a series system of 'n' events, where, 'n' is the number of nodes participating in the path. If $R_i$ denotes the Reliability of $i^{th}$ node ($n_i$), defined as the probability that it will sufficiently be able to carry out a certain communication then we define $R_i$ as:

$$R_i = \begin{cases} 1, & \text{if } \forall\ n_i \in N,\ d_i \leq d_{max}\ \&\ Erem_i \geq E_{TH} \\ 0, & \text{otherwise} \end{cases}$$

$n_i$, is the $i^{th}$ node in the path of N nodes, $d_{max}$ is the maximum allowable local communication distance for a given node and $E_{TH}$ is the minimum threshold enereggy required with a node.

Now, $R_{PATH}$ = P("The Series System Works Properly")

$$\Rightarrow R_{PATH} = P(n_1 \cap n_2 \cap \ldots \cap n_N)$$

$$= P(n_1)P(n_2) \ldots P(n_N)$$

$$= \prod_{i=1}^{n} R_i$$

Furthermore, as shown in operation 306, a second sensor node of the sensor nodes that is in direct communication with the first sensor node is selected, based on the parameters. Such second sensor node may include one of the above described second sensor nodes from which the first sensor nodes receives the parameters, for example. Thus, the second sensor node may be included in one of the routes for which the parameters are received.

In one embodiment, the second sensor node may be selected in response to a determination that the second sensor node is included in one of the routes for which the associated parameters meet predetermined criteria (e.g. rules, etc.). Just by way of example, the second sensor node may be selected in response to a determination that the selected second sensor node is included in a route associated with parameters indicating that the route is the most reliable of all of the routes. Thus, in the above example, each set of parameters received in association with the routes may be compared to determine the most reliable route of all of the routes, and the second sensor node included in such most reliable route may be automatically selected.

As noted above, the reliability of each of the routes ($R_{PATH}$) may be determined from at least some of the other parameters associated with such route (e.g. the average hop distance, the average remaining energy). Accordingly, it should be noted that the second sensor node may be selected based on the parameters in a manner whereby the selection is directly based on one of the parameters and indirectly based on other ones of the parameters (e.g. directly from one of the parameters that is generated from other ones of the parameters). Optionally, if the reliability of one of the routes is the value "0", such route may be automatically removed from consideration in the selection of the second sensor node.

To this end, the second sensor node may optionally be selected based on its inclusion in a route for which parameters have been received indicating that the route is the most reliable in terms of completing transmission of the sensed data to the gateway node. Of course, while various examples of selecting the second sensor node based on the parameters are described above, it should be noted that the second sensor node may be selected based on the parameters in any desired manner.

Still yet, as shown in operation 308, the sensed data is forwarded from the first sensor node to the selected second sensor node. It should be noted that the sensed data may be forwarded (e.g. communicated, transmitted, etc.) to the selected second sensor node in any desired manner that is over the wireless sensor network, for allowing the selected second sensor node to receive the sensed data. For example, the sensed data may be forwarded from the first sensor node as a packet over the wireless sensor network to the second sensor node.

Further, the identifying (operation 302), receiving (operation 304), selecting (operation 306), and forwarding (operation 308) may be repeated for each selected second sensor node until a parent root sensor node in direct communication with the gateway node receives the sensed data for forwarding the sensed data to the other network via the gateway node. For example, upon receipt of the sensed data by the selected sensor node, the selected second sensor node may identify the same (operation 302), such that the second sensor node becomes the new first sensor node with respect to the method 300.

Thus, the new first sensor node may also receive parameters associated with routes existing between such new first sensor node and the gateway node (operation 304). Optionally, such parameters may include those already received by the new first sensor node which were updated for forwarding to the first sensor node in the manner described above, or may be received by the new first sensor node after the receipt of the sensed data by the new first sensor node. Based on such parameters, the new first sensor node may select a second sensor node that is in direct communication with the new first sensor node, and may forward the sensed data to the selected second sensor node.

In this way, the sensed data may be communicated via a dynamically determined route of the wireless network to the gateway node (e.g. by dynamically selecting each sensor node to which the sensed data is forwarded), such that the sensed data is communicated in an in energy efficient, time constrained and reliable manner. This may allow the sensed data to be communicated (e.g. uploaded, etc.) to the other network via the gateway node, such that a device located on the other network may receive the sensed data reliably for a longer duration (e.g. in case of certain applications where battery recharging or replacing is not possible). Moreover, dynamically determining the route by which the sensed data is communicated may save energy by providing a multi-hop reliable route, may save bandwidth by reducing a number of retransmissions caused due to loss of the sensed data on unreliable paths (e.g. thus, also causing a delay to the end user), etc.

In addition, by dynamically determining the sensor nodes by which the sensed data is communicated, a load placed on the wireless sensor network may be evenly distributed among the sensor nodes of the wireless sensor network, such that the sensor nodes may remain in a uniform energy state. Such dynamic determination may also prevent 'holes' in the routes that may lead to a disconnected wireless sensor network causing services of the wireless sensor network to be unavailable to devices of the other network.

Still yet, latency control may be provided by taking into consideration when selecting the second sensor node the hop count the sensed data is required to travel for a particular route. For example, less hop counts may lead to large hop distances and high hop counts may introduce increased delay. Thus, an optimal number for hop selection may be required so that an energy latency tradeoff is achieved.

As an option, aggregation of the sensed data may be performed on the dynamically determined route. Such aggregation may reduce a total number of packets being communicated across the wireless sensor network at any given time, for example. As another option, if none of the parent sensor nodes of the first sensor node are capable of being selected (e.g. are determined to be reliable due to battery depletion, disaster etc.), backtracking may be utilized whereby the first sensor node sends the sensed data to one of its child nodes. Upon receipt of the sensed data from the first sensor node, the child node may then send the sensed data to a parent sensor node determined to be second best in terms of the parameters associated therewith (and the original first sensor node may be marked as unreliable).

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
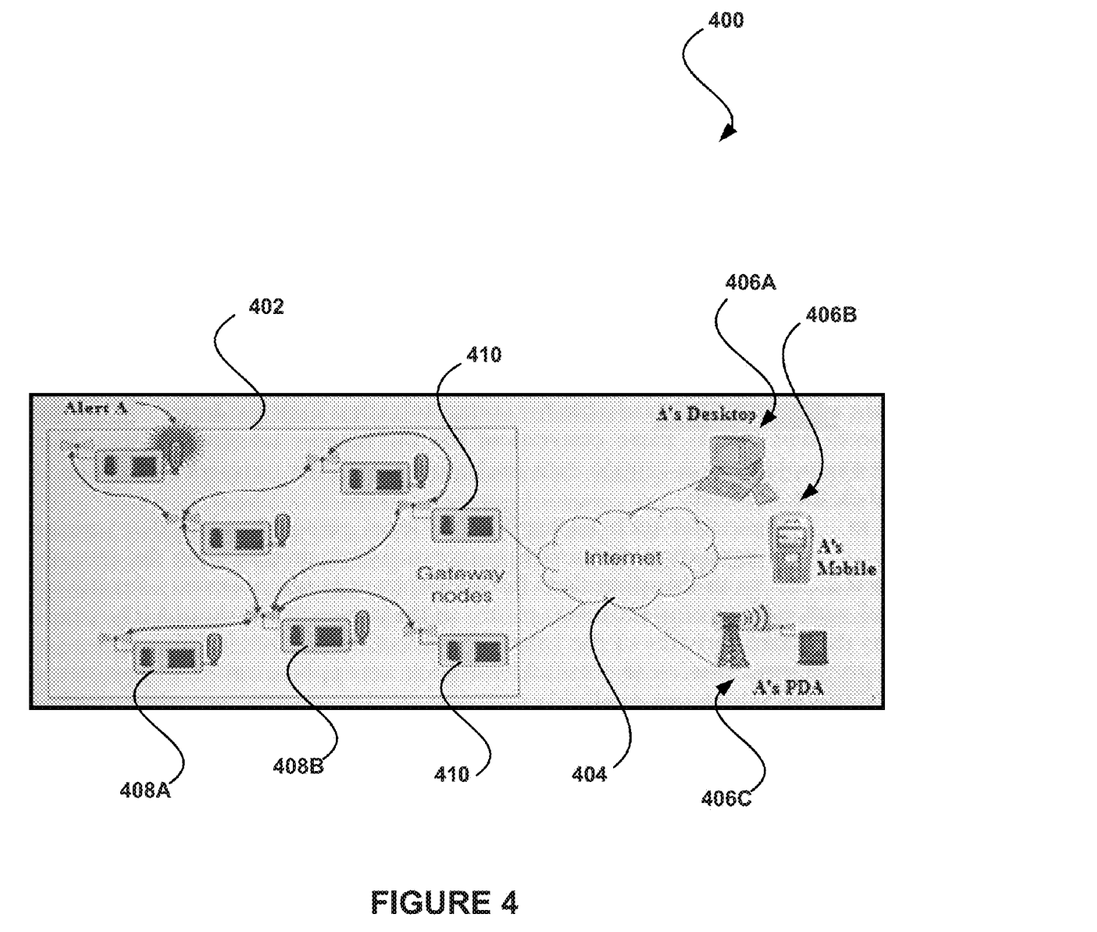
FIG. 4 illustrates a system for routing data in a wireless sensor network, in accordance with yet another embodiment.

FIG. 4 illustrates a system 400 for routing data in a wireless sensor network, in accordance with yet another embodiment. As an option, the system 400 may be implemented in the context of the details of FIGS. 1-3. Of course, however, the system 400 may be implemented in any desired environment. Further, the aforementioned definitions may equally apply to the description below.

As shown, a wireless sensor network 402 including a plurality of sensor nodes 408 (e.g. a portion of the sensor nodes shown as 408A-B) and gateway nodes 410 is in communication with the Internet 404 via the gateway nodes 410. The sensor nodes 408 sense data and communicate the same to devices 406A-C on the Internet 404 via the gateway nodes 410. Such devices 406A-C may include a desktop computer 406A, mobile device 406B, PDA 406C, etc.

Initially, sensed data is identified by a first one of the sensor nodes 408A (child node). The first sensor node 408A then selects a second sensor node 408B (parent node) in direct communication with the first sensor node 408A for communicating the sensed data thereto, such that the sensed data may be communicated to the Internet 404 via one of the gateway nodes 410 by way of the selected second sensor node 408B. With respect to the present embodiment, the second sensor node 408B is selected based on parameters that are associated with each route existing between the first sensor node 408A and the gateway nodes 410. Thus, each route may be described by the parameters.

Such parameters may optionally be received by the first sensor node 408A, such that the first sensor node 408A may have logic included therein for selecting the second sensor node 408B based on the parameters. For example, each of the sensor nodes 408 may store (e.g. in a table, etc.) a current status of their immediate parent nodes in a profile for each parent node (e.g. sensor nodes closer to the gateway nodes 410 in terms of hop count as compared to itself), such that selection of the second sensor node 408B may be performed by the first sensor node 408A.

Further, the parameters may be received from each second sensor node 408B in direct communication with the first sensor node 408A. In one embodiment, the second sensor nodes 408B from which the parameters are received may include those included in routes between the first sensor node 408A and the gateway nodes 410.

Just by way of example, the parameters may indicate a reliability of each of the routes existing between the first sensor node 408A and the gateway nodes 410, such that the second sensor node 408B included in the route with the greatest reliability may be selected for communicating the sensed data thereto. Upon selection of the second sensor node 408B, the sensed data is communicated to the selected second sensor node 408B. If the selected second sensor node 408B is in direct communication with one of the gateway nodes 410, the selected second sensor node 408B may forward the sensed data to the gateway nodes 410 for sending the sensed data to the devices 406A-C on the Internet 404.

If, however, the selected second sensor node 408B is not in direct communication with one of the gateway nodes 410, the selected second sensor node 408B may become the first sensor node 408A in terms of the operations described in the present embodiment, such that a next second sensor node 408B to the selected second sensor node 408B may be selected for communicating the sensed data thereto, based on parameters of the routes existing between the next second sensor node 408B and the gateway nodes 410. This dynamic selection of parent nodes based on parameters may continue until the sensed data is received by a sensor node 408 in direct communication with one of the gateway nodes 410.

Figure 5:
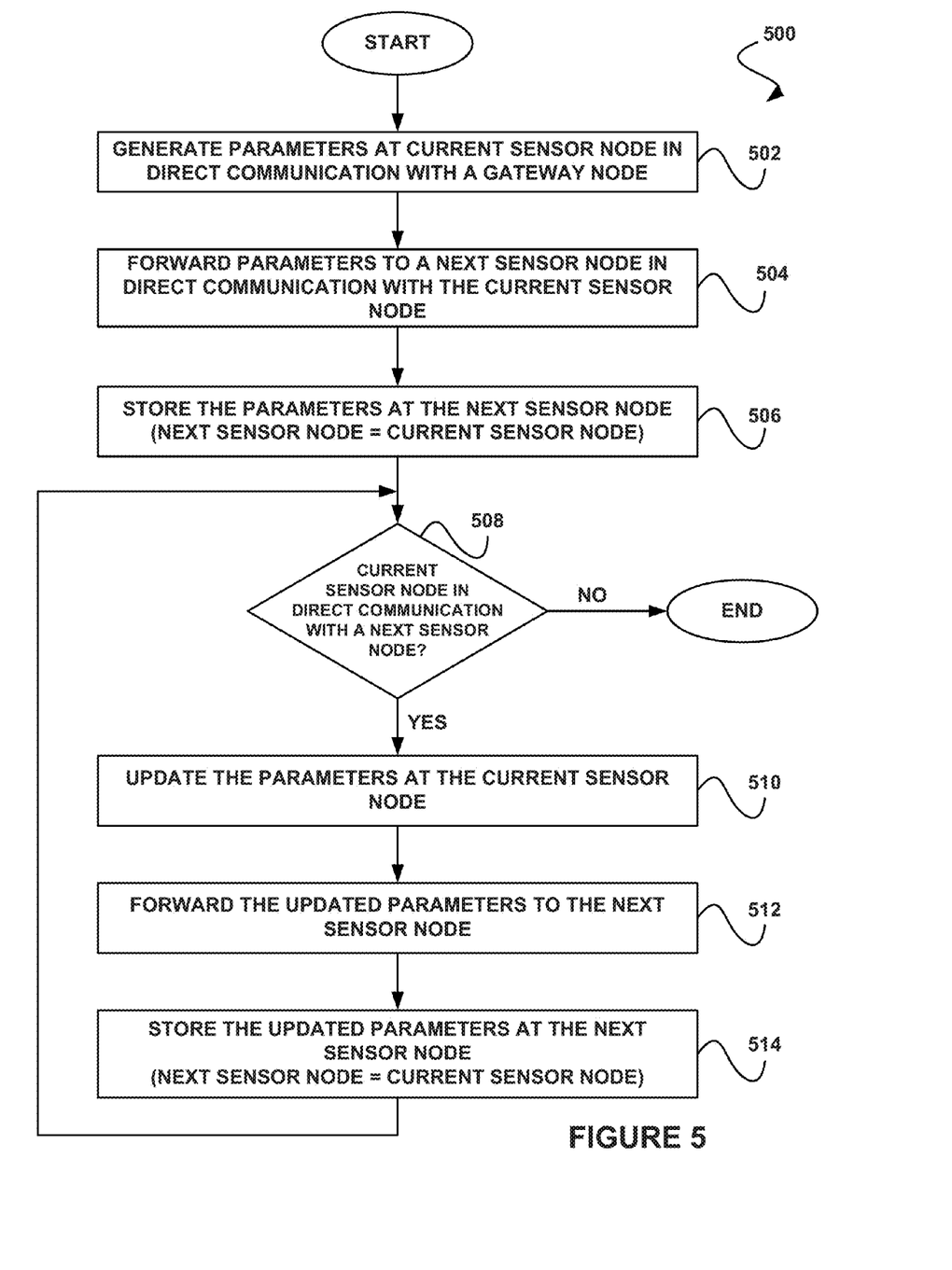
FIG. 5 illustrates a method for receiving, at a sensor node of a wireless sensor network, parameters associated with routes existing between the sensor node and a gateway node of the wireless sensor network, in accordance with still yet another embodiment.

FIG. 5 illustrates a method 500 for receiving, at a sensor node of a wireless sensor network, parameters associated with routes existing between the sensor node and a gateway node of the wireless sensor network, in accordance with still yet another embodiment. As an option, the method 500 may be carried out in the context of the details of FIGS. 1-4. Of course, however, the method 500 may be carried out in any desired environment. Further, the aforementioned definitions may equally apply to the description below.

As shown in operation 502, parameters are generated at a current sensor node in direct communication with a gateway node. The parameters may each be generated utilizing a different predetermined algorithm. For example, the parameters may include a hop count from the current sensor node to the gateway node, a hop distance from the current sensor node to the gateway node, an average energy level available (e.g. remaining) for the current sensor node, a reliability for the route between the current sensor node and the gateway node, etc.

The parameters are then forwarded to a next sensor node in direct communication with the current sensor node, as shown in operation 504. In the present embodiment, such next sensor node may include any sensor node that is further from the gateway node in terms of hop count than the current sensor node. Thus, for each next sensor node in direct communication with the current sensor node, the parameters may be forwarded thereto. In one embodiment, the parameters may be forwarded in the form of a SPP packet.

Additionally, as shown in operation 506, the parameters are stored at the next sensor node to which the parameters were forwarded. For example, the parameters may be stored in a profile of the currents sensor node maintained by the next sensor node in a table (or other data structure). In the context of the present embodiment, the next sensor node is then identified as the current sensor node, as referenced below.

Further, it is determined whether the current sensor node is in direct communication with a next sensor node, as shown in decision 508. If the current sensor node is not in direct communication with a next sensor node, the method 500 terminates. In this way, parameters for a route between the current sensor node and the gateway node may be stored by the current sensor node.

If it is determined that the current sensor node is in direct communication with a next sensor node, the parameters are updated at the current sensor node. Note operation 510. For example, the parameters may be updated by updating the hop count to reflect the cop count from the current sensor node to the gateway node, updating the hop distance to reflect the hop distance from the current sensor node to the gateway node, updating the average energy level of reflect the average energy level available (e.g. remaining) for sensor nodes in the route between and including the current sensor node and the gateway node, updating the reliability for the route between the current sensor node and the gateway node, etc.

The updated parameters are then forwarded to the next sensor node, as shown in operation 512. Still yet, the parameters are stored by the next sensor node, as shown in operation 514. In the context of the present embodiment, the next sensor node is then identified as the current sensor node. It is then again determined whether the current sensor node is in direct communication with a next sensor node (decision 508), as described above. In this way, parameters associated with routes existing between a sensor node and a gateway node may be received by such sensor node.

Figure 6:
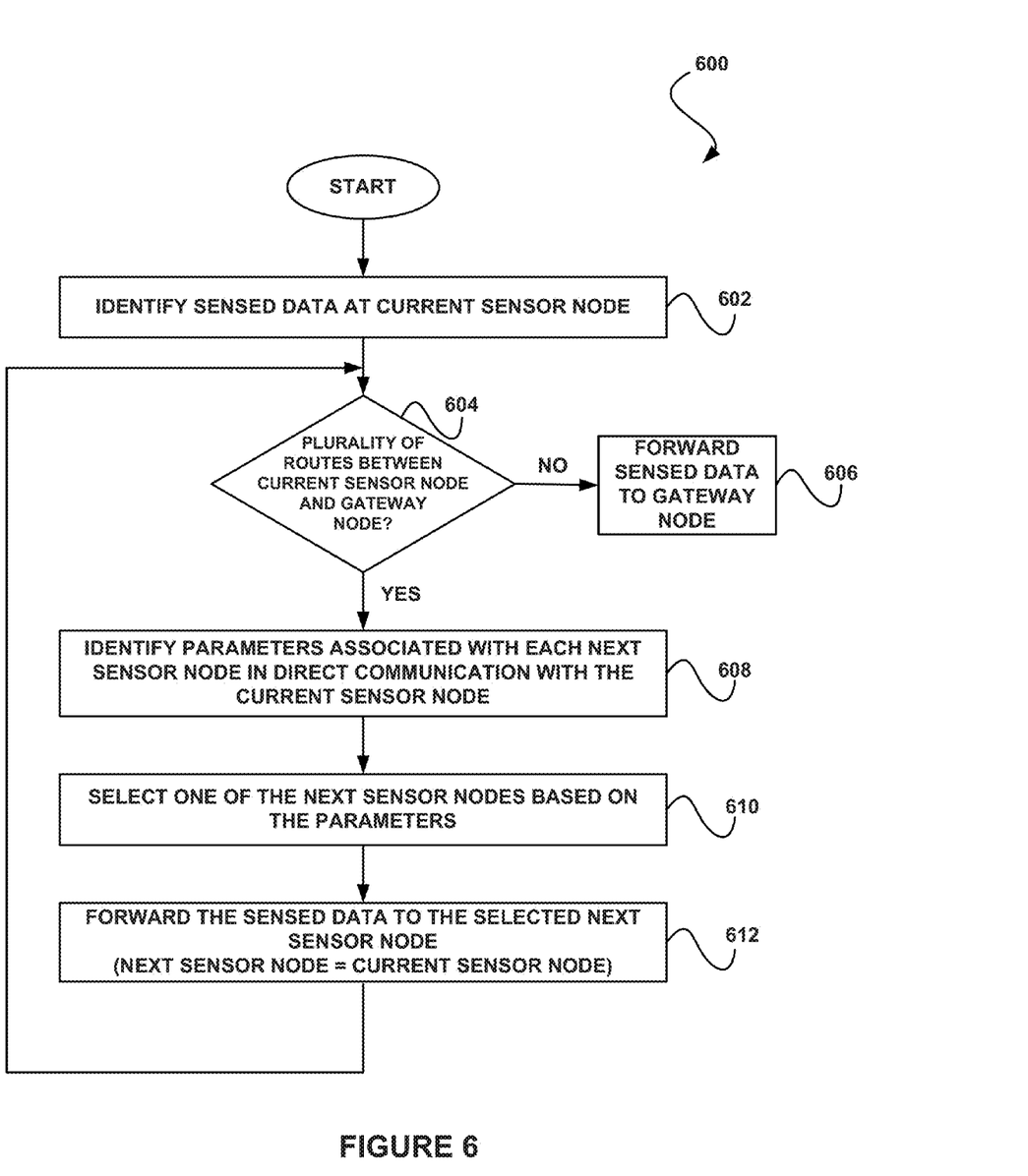
FIG. 6 illustrates a method for selecting a sensor node to which sensed data is to be forwarded, in accordance with another embodiment.

FIG. 6 illustrates a method 600 for selecting a sensor node to which sensed data is to be forwarded, in accordance with another embodiment. As an option, the method 600 may be carried out in the context of the details of FIGS. 1-5. Of course, however, the method 600 may be carried out in any desired environment. Further, the aforementioned definitions may equally apply to the description below.

As shown in operation 602, sensed data is identified at a current sensor node. The sensed data may be identified by sensing the data at the current sensor node, in one embodiment. In another embodiment, the sensed data may be identified by receiving the sensed data at the current sensor node from another sensor node.

It is then determined in decision 604 whether a plurality of routes exist between the current sensor node and any gateway nodes. For example, it is may be determined that routes exist if it is determined that the current sensor node is only in communication with the gateway nodes via a plurality other sensor nodes making up different paths to the gateway nodes. If it is determined that multiple routes do not exist, the sensed data is forwarded to the gateway node. Note operation 606.

If, however, it is determined that multiple routes do exist, parameters associated with each next sensor node in direct communication with the current sensor node are identified. Note operation 608. With respect to the present embodiment, the next sensor node may include any node in a route between the current sensor node and the gateway node with which the current sensor node is in direct communication. As an option, the parameters may be identified in a data structure of the next sensor node.

One of the next sensor nodes is then selected based on the parameters, as shown in operation 610. Furthermore, as shown in operation 612, the sensed data is forwarded to the selected next sensor node. In the context of the present embodiment, the selected next sensor node is then identified as the current sensor node. It is the again determined whether multiple routes exist between the current sensor node and any gateway nodes (decision 604).

In this way, a route between the current sensor node which identified the sensed data in operation 602 and one of the gateway nodes may be dynamically determined. For example, such route may be dynamically determined by dynamically determining, based on the parameters, each sensor node to which the sensed data is forwarded.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program embodied on a non-transitory computer readable medium, comprising:
   computer code for identifying sensed data utilizing a first sensor node of a plurality of sensor nodes in a wireless sensor network, the sensor nodes each capable of sensing data, the sensed data including data directly sensed from an object outside of the wireless sensor network, where the first sensor node is the only sensor node that senses the sensed data;
   computer code for receiving, at the first sensor node from at least one second sensor node in direct communication with the first sensor node via the wireless sensor network, a plurality of parameters associated with each route existing between the first sensor node and a gateway node in the wireless sensor network connecting the wireless sensor network to another network, wherein the at least one second sensor node is a parent node to the first sensor node;
   computer code for selecting one of the at least one second sensor node that is in direct communication with the first sensor node, based on the parameters;
   computer code for forwarding the sensed data including the data directly sensed from the object outside of the wireless sensor network from the first sensor node to the selected second sensor node;
   computer code for receiving, at the selected second sensor node from the first sensor node, the sensed data including the data directly sensed from the object outside of the wireless sensor network, wherein the selected second sensor node has at least one child node including the first sensor node, and further has at least one parent sensor node that is in direct communication with the selected second sensor node and that is in a route existing between the selected second sensor node and the gateway node;
   computer code for determining, by the selected second sensor node, that none of the at least one parent sensor node of the selected second sensor node is to be selected for forwarding the sensed data to the gateway node in the wireless network;
   computer code for, in response to the determination that none of the at least one parent sensor node of the selected second sensor node is to be selected for forwarding the sensed data, backtracking by sending, by the selected second sensor node, the sensed data to a selected one of the at least one child node of the selected second sensor node;
   computer code for receiving, at the selected child node of the selected second sensor node, the sensed data; and
   computer code for, in response to receiving the sensed data at the selected child node of the selected second sensor node, marking the selected second sensor node as unreliable for at least temporarily avoiding future use of the selected second sensor node;
   wherein the computer program is operable such that each of the sensor nodes in the wireless network stores a current status of each immediate parent node of the sensor node in a profile for the immediate parent node;
   wherein the parameters associated with each route include an average hop distance of the route;
   wherein the average hop distance of each route includes a mean inter-nodal distance for all hops from a root parent sensor node in direct communication with the gateway node to the selected second sensor node in direct communication with the first sensor node, such that the average hop distance of each route includes an estimate of an average distance that it is required to communicate the sensed data in a single hop.

2. The computer program of claim 1, wherein for each of the at least one second sensor node, the computer program is operable such that the parameters are received therefrom for routes inclusive of the second sensor node.

3. The computer program of claim 1, wherein the parameters associated with each route include a set of predetermined types of parameters.

4. The computer program of claim 1, wherein the parameters associated with each route include a hop count of the route.

5. The computer program of claim 1, wherein the parameters associated with each route include an average of remaining energy of sensor nodes in the route.

6. The computer program of claim 1, wherein the parameters associated with each route include reliability of the route.

7. The computer program of claim 1, wherein the parameters associated with each route are generated based on information gathered across sensor nodes included in the route.

8. The computer program of claim 1, wherein the computer program is operable such that the parameters are generated for each of the routes by:
   determining, at the root parent sensor node in direct communication with the gateway node, a value for each of a plurality of predetermined types of parameters;
   transmitting the value for each of the plurality of predetermined types of parameters to an immediate child sensor node in the route;
   updating, at the immediate child sensor node, the value for each of the plurality of predetermined types of parameters; and
   repeating the transmitting and the updating for each subsequent sensor node in the route;
   wherein the parameters received at the first sensor node include the value for each of the plurality of predetermined types of parameters updated by the at least one second sensor node.

9. The computer program of claim 1, wherein the parameters associated with each route are received as a self profile packet (SPP).

10. The computer program of claim 1, wherein the computer program is operable such that the one of the at least one second sensor nodes is selected in response to a determination that the selected second sensor node is included in a route associated with parameters indicating that the route is the most reliable of all of the routes.

11. The computer program of claim 10, wherein the reliability includes a probability that transmission of the sensed data to the gateway node will be completed.

12. The computer program of claim 1, wherein the one of the at least one second sensor nodes that is selected exists in a route between the first sensor node and the gateway node.

13. The computer program of claim 1, wherein the identifying, receiving, selecting, and forwarding are repeated for each selected second sensor node until the parent root sensor node in direct communication with the gateway node receives the sensed data for forwarding the sensed data to the other network.

14. A method, comprising:
  identifying sensed data utilizing a first sensor node of a plurality of sensor nodes in a wireless sensor network, the sensor nodes each capable of sensing data, the sensed data including data directly sensed from an object outside of the wireless sensor network, where the first sensor node is the only sensor node that senses the sensed data;
  receiving, at the first sensor node from at least one second sensor node in direct communication with the first sensor node via the wireless sensor network, a plurality of parameters associated with each route existing between the first sensor node and a gateway node in the wireless sensor network connecting the wireless sensor network to another network, wherein the at least one second sensor node is a parent node to the first sensor node;
  selecting one of the at least one second sensor node that is in direct communication with the first sensor node, based on the parameters;
  forwarding the sensed data including the data directly sensed from the object outside of the wireless sensor network from the first sensor node to the selected second sensor node;
  receiving, at the selected second sensor node from the first sensor node, the sensed data including the data directly sensed from the object outside of the wireless sensor network, wherein the selected second sensor node has at least one child node including the first sensor node, and further has at least one parent sensor node that is in direct communication with the selected second sensor node and that is in a route existing between the selected second sensor node and the gateway node;
  determining, by the selected second sensor node, that none of the at least one parent sensor node of the selected second sensor node is to be selected for forwarding the sensed data to the gateway node in the wireless network;
  in response to the determination that none of the at least one parent sensor node of the selected second sensor node is to be selected for forwarding the sensed data, backtracking by sending, by the selected second sensor node, the sensed data to a selected one of the at least one child node of the selected second sensor node;
  receiving, at the selected child node of the selected second sensor node, the sensed data; and
  in response to receiving the sensed data at the selected child node of the selected second sensor node, marking the selected second sensor node as unreliable for at least temporarily avoiding future use of the selected second sensor node;
  wherein each of the sensor nodes in the wireless network stores a current status of each immediate parent node of the sensor node in a profile for the immediate parent node;
  wherein the parameters associated with each route include an average hop distance of the route;
  wherein the average hop distance of each route includes a mean inter-nodal distance for all hops from a root parent sensor node in direct communication with the gateway node to the selected second sensor node in direct communication with the first sensor node, such that the average hop distance of each route includes an estimate of an average distance that it is required to communicate the sensed data in a single hop.

15. A system, comprising:
  a processor for:
    identifying sensed data utilizing a first sensor node of a plurality of sensor nodes in a wireless sensor network, the sensor nodes each capable of sensing data, the sensed data including data directly sensed from an object outside of the wireless sensor network, where the first sensor node is the only sensor node that senses the sensed data;
    receiving, at the first sensor node from at least one second sensor node in direct communication with the first sensor node via the wireless sensor network, a plurality of parameters associated with each route existing between the first sensor node and a gateway node in the wireless sensor network connecting the wireless sensor network to another network, wherein the at least one second sensor node is a parent node to the first sensor node;
    selecting one of the at least one second sensor node that is in direct communication with the first sensor node, based on the parameters;
    forwarding the sensed data including the data directly sensed from the object outside of the wireless sensor network from the first sensor node to the selected second sensor node;
    receiving, at the selected second sensor node from the first sensor node, the sensed data including the data directly sensed from the object outside of the wireless sensor network, wherein the selected second sensor node has at least one child node including the first sensor node, and further has at least one parent sensor node that is in direct communication with the selected second sensor node and that is in a route existing between the selected second sensor node and the gateway node;
    determining, by the selected second sensor node, that none of the at least one parent sensor node of the selected second sensor node is to be selected for forwarding the sensed data to the gateway node in the wireless network;
    in response to the determination that none of the at least one parent sensor node of the selected second sensor node is to be selected for forwarding the sensed data, backtracking by sending, by the selected second sensor node, the sensed data to a selected one of the at least one child node of the selected second sensor node;
    receiving, at the selected child node of the selected second sensor node, the sensed data; and
    in response to receiving the sensed data at the selected child node of the selected second sensor node, marking the selected second sensor node as unreliable for at least temporarily avoiding future use of the selected second sensor node;
    wherein the system is operable such that each of the sensor nodes in the wireless network stores a current status of each immediate parent node of the sensor node in a profile for the immediate parent node;

wherein the parameters associated with each route include an average hop distance of the route;

wherein the average hop distance of each route includes a mean inter-nodal distance for all hops from a root parent sensor node in direct communication with the gateway node to the selected second sensor node in direct communication with the first sensor node, such that the average hop distance of each route includes an estimate of an average distance that it is required to communicate the sensed data in a single hop.

16. The system of claim 15, wherein the processor is coupled to memory via a bus.

17. The computer program of claim 1, wherein the sensed data includes inanimate conditions associated with the object.

* * * * *

UNITED STATES PATENT AND TRADEMARK OFFICE
CERTIFICATE OF CORRECTION

PATENT NO. : 8,760,995 B1
APPLICATION NO. : 12/832945
DATED : June 24, 2014
INVENTOR(S) : Amit Gautam et al.

Page 1 of 1

It is certified that error appears in the above-identified patent and that said Letters Patent is hereby corrected as shown below:

On the title page item 56:

On the second page:

References Cited; column 2, line 7, please replace "protocl" with --protocol--.

Signed and Sealed this
Twenty-second Day of March, 2016

Michelle K. Lee
*Director of the United States Patent and Trademark Office*